(12) United States Patent
Ting

(10) Patent No.: US 9,720,466 B2
(45) Date of Patent: Aug. 1, 2017

(54) HEAT DISSIPATION COMPONENT

(71) Applicants: Inventec (Pudong) Technology Corporation, Shanghai (CN); INVENTEC CORPORATION, Taipei (TW)

(72) Inventor: Kuo-Chi Ting, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 15/140,454

(22) Filed: Apr. 27, 2016

(65) Prior Publication Data

US 2017/0153676 A1    Jun. 1, 2017

(30) Foreign Application Priority Data

Nov. 27, 2015 (CN) .......................... 2015 1 0846695

(51) Int. Cl.
*H05K 7/20* (2006.01)
*G06F 1/20* (2006.01)

(52) U.S. Cl.
CPC .................................. *G06F 1/203* (2013.01)

(58) Field of Classification Search
CPC . G06F 1/181–1/182; H05K 7/20218–7/20381; H05K 7/20409–7/20418; H05K 7/20009–7/202; H01L 23/367–23/3677; H01L 23/473; H01L 23/46–23/467
USPC ...... 361/676–678, 679.46–679.54, 688–723; 165/80.1–80.5, 104.33, 185; 174/15.1–15.3, 16.1–16.3, 547, 548; 257/712–722, E23.088; 24/453, 458–459; 454/184; 312/236
See application file for complete search history.

(56) References Cited

U.S. PATENT DOCUMENTS

| | | | |
|---|---|---|---|
| 2006/0213643 A1* | 9/2006 | Hashimoto | F04D 29/30 165/80.3 |
| 2008/0011461 A1* | 1/2008 | Hwang | F04D 29/422 165/122 |
| 2009/0067991 A1* | 3/2009 | Hwang | F04D 29/162 415/119 |
| 2009/0103264 A1* | 4/2009 | Hung | F04D 25/0693 361/697 |

(Continued)

*Primary Examiner* — Anthony Haughton
*Assistant Examiner* — Razmeen Gafur
(74) *Attorney, Agent, or Firm* — CKC & Partners Co., Ltd.

(57) ABSTRACT

Heat dissipation component includes a fan unit, a first housing, and an airflow-guiding plate. The fan unit includes a fan blade portion, and a fan housing including a first air-guided cap and a second air-guided cap. The second air-guided cap, having a fan inlet, is disposed on the first air-guided cap. The fan blade portion is disposed between the first air-guided cap and the second air-guided cap, and pivotally-connected to the fan housing at the second air-guided cap. The first housing is disposed on a side of the second air-guided cap away from the first air-guided cap. An inlet airway is formed between the first housing and the fan unit. The airflow-guiding plate is disposed between the first housing and the second air-guided cap, and extended from outline of the main fan inlet toward outline of the inlet airway and away from the main fan inlet.

13 Claims, 4 Drawing Sheets

(56) References Cited

U.S. PATENT DOCUMENTS

| | | | | |
|---|---|---|---|---|
| 2009/0116191 A1* | 5/2009 | Liou | G06F 1/20 | 361/695 |
| 2009/0290306 A1* | 11/2009 | Zhao | F04D 25/0613 | 361/695 |
| 2009/0294171 A1* | 12/2009 | Chen | G06F 1/20 | 174/547 |
| 2010/0067194 A1* | 3/2010 | Meyer, IV | F28D 15/0233 | 361/679.48 |
| 2010/0149753 A1* | 6/2010 | Lin | H05K 7/20172 | 361/695 |
| 2010/0188817 A1* | 7/2010 | Chou | H01L 23/467 | 361/697 |
| 2010/0246123 A1* | 9/2010 | Chuang | G06F 1/20 | 361/693 |
| 2011/0070080 A1* | 3/2011 | Peng | F04D 19/007 | 415/214.1 |
| 2011/0073159 A1* | 3/2011 | Shen | F21V 29/02 | 136/246 |
| 2011/0132582 A1* | 6/2011 | Cheng | F04D 25/045 | 165/121 |
| 2011/0228476 A1* | 9/2011 | Lin | G06F 1/185 | 361/695 |
| 2011/0228477 A1* | 9/2011 | Hong | H05K 7/20181 | 361/695 |
| 2011/0292607 A1* | 12/2011 | Tseng | F04D 29/023 | 361/695 |
| 2012/0044642 A1* | 2/2012 | Rodriguez | H05B 33/0803 | 361/692 |
| 2012/0057300 A1* | 3/2012 | Tan | H01L 23/38 | 361/697 |
| 2013/0148298 A1* | 6/2013 | Liu | H05K 7/20145 | 361/695 |
| 2013/0250515 A1* | 9/2013 | Wu | H05K 7/20145 | 361/692 |
| 2013/0286292 A1* | 10/2013 | Yamaguchi | G06F 1/203 | 348/725 |
| 2014/0009884 A1* | 1/2014 | Chen | H01L 23/427 | 361/697 |
| 2014/0049915 A1* | 2/2014 | Wang | H05K 7/20127 | 361/694 |
| 2014/0185223 A1* | 7/2014 | Matsumoto | G06F 1/203 | 361/679.27 |

* cited by examiner

HEAT DISSIPATION COMPONENT

RELATED APPLICATIONS

This application claims priority to Chinese Application Serial Number 201510846695.X, filed Nov. 27, 2015, which is herein incorporated by reference.

BACKGROUND

Field of Invention

The present disclosure relates to a heat dissipation component of a portable computing equipment. More particularly, the present disclosure relates to a fan module of a portable computing equipment.

Description of Related Art

Generally speaking, while a portable computing equipment, such as notebook etc., is working properly, the mechanical components of the portable computing equipment would produce noise to some degree, for example, a rotating fan of a fan module or an operating motor etc. However, noise, produced by a rotating fan of a fan module or an operating motor, usually belongs to some pure-tone noise, composed with narrow frequencies distribution. The pure-tone noise are inconspicuously perceive by auditory nerve, furthermore, in some cases, owing to auditory fatigue or listening fatigue, the auditory nerve may regard the pure-tone noise as background sounds under long-term operation. However, while a fan module of the portable computing equipment is operating, airflow would be inhaled into the fan module by a pressure difference, to dissipate heat. During airflow being inhaled into the fan module, the flowing air flow would induce wind shear, generated by velocity differences of airflow. Therefore, wind shear, induced by the fan module, would produce noise of wind shear, composed with widespread frequencies distribution, which may influence the user or people around the user. Unfortunately, the auditory nerve is more sensitive to perceive a noise with widespread frequencies distribution, such as noise of wind shear, and the auditory nerve's sensitivity for the widespread frequencies distribution would decay more gradually comparing to the pure-tone. Moreover, most of fan modules in a general portable computing equipment are directly embedded into the housing of the portable computing equipment, without any air-guided structure for guiding airflow inhaled by the fan module. Turbulence of airflow may occur, while the airflow being obstructed by the structure inside the housing or compression of the airflow, which may have a chance to generate greater noise.

Consequently, the available structure of fan module, as described above, apparently exists inconvenience and defect, which needs further improvement. To deal with the aforesaid problem, practitioners of ordinary skill in the art have striven to attain a solution, and the problem still lacks a suitable solution to be developed. Therefore, to deal with the aforesaid problem effectively is an important subject of research and development, and also a desired improvement in the art.

SUMMARY

The present disclosure provides a heat dissipation component disposed inside a portable computing equipment. The heat dissipation component includes a fan unit, a first housing, and at least one airflow guiding plate. The fan unit includes a fan housing and a fan blade portion. The fan housing includes a first air-guided cap and a second air-guided cap. The second air-guided cap is disposed on the first air-guided cap. The second air-guided cap has a main fan inlet. The fan blade portion is disposed between the first air-guided cap and the second air-guided cap, and pivotally-connected to the fan housing at the second air-guided cap. The first housing is disposed on a side of the second air-guided cap away from the first air-guided cap. An inlet airway is formed between the first housing and the fan unit. At least one airflow guiding plate is disposed between the first housing and the second air-guided cap, and extended from an outline of the main fan inlet toward an outline of the inlet airway and away from the main fan inlet.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
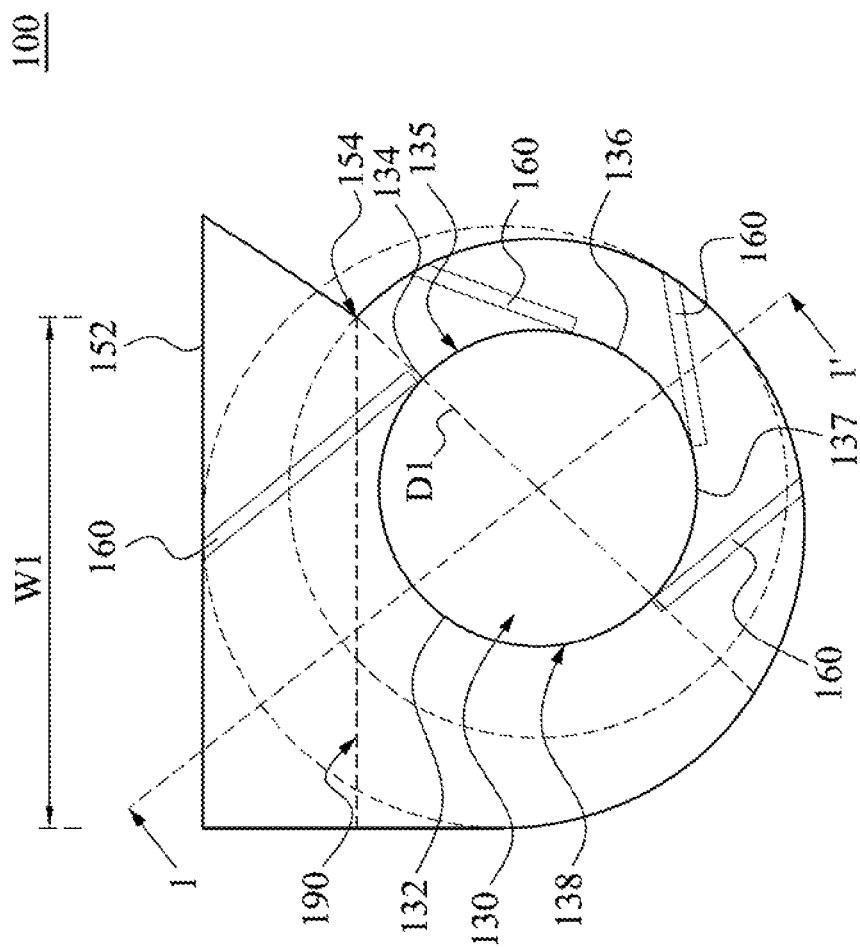
FIG. 1 is a top perspective view of a heat dissipation component according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that when an element is referred to as being "on", "over" another element, it can be directly on the other element or intervening elements may be present therebetween. In contrast, when an element is referred to as being "directly on" another element, there are no intervening elements present.

Figure 2:
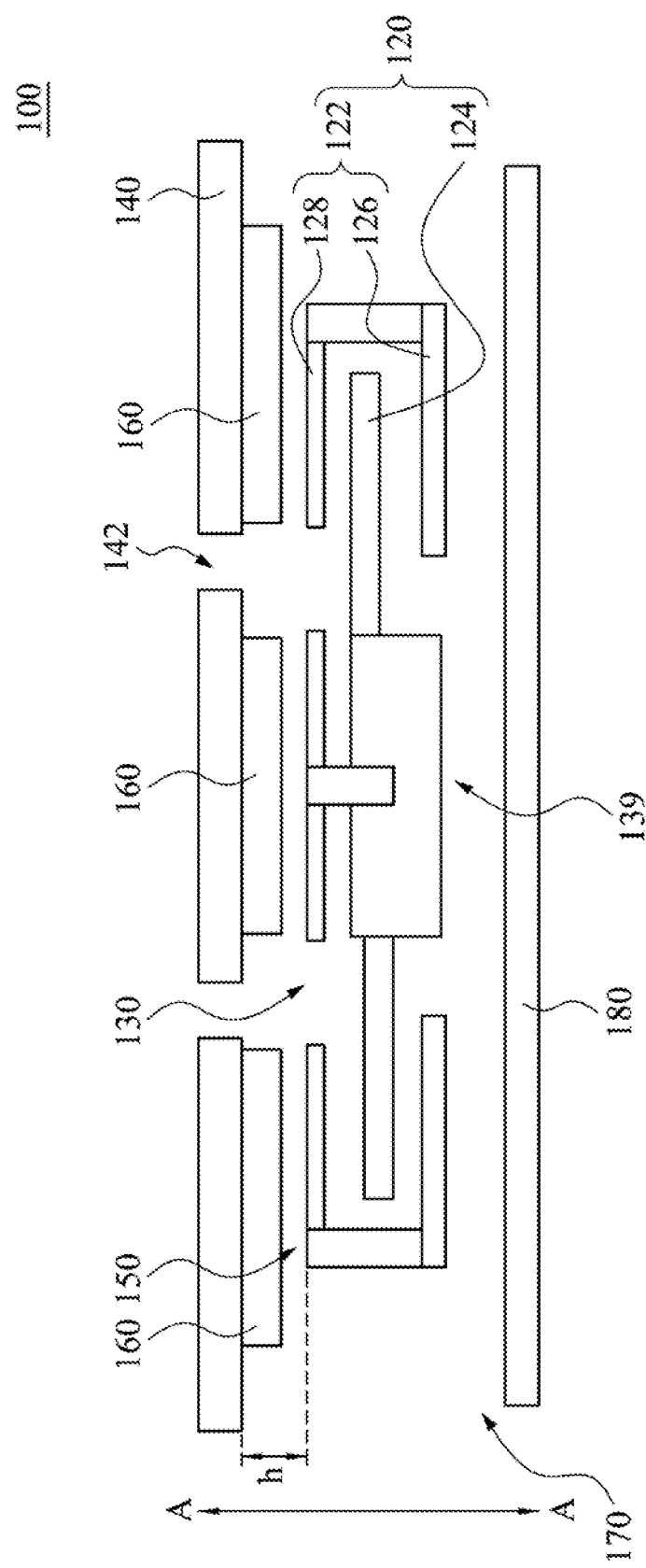
FIG. 2 is a cross-sectional views of a heat dissipation component along a line 1-1' in FIG. 1 according to an embodiment of the present disclosure.

FIG. 1 illustrates a top perspective view of a heat dissipation component 100 according to an embodiment of the present disclosure. FIG. 2 illustrates a cross-sectional views of a heat dissipation component 100 along a line 1-1' in FIG. 1 according to an embodiment of the present disclosure. As shown in FIG. 1 and FIG. 2, a heat dissipation component 100, disposed inside a portable computing equipment, may include a fan unit 120, a first housing 140, and at least one airflow guiding plate 160. The fan unit 120 includes a fan housing 122 and a fan blade portion 124. The fan housing 122 includes a first air-guided cap 126 and a second air-guided cap 128. The second air-guided cap 128 is disposed on the first air-guided cap 126. The second air-guided cap 128 has a main fan inlet 130. In some embodiments, the fan housing 122 may further include a sidewall structure, respectively adjoined and located between the first air-guided cap 126 and the second air-guided cap 128. The sidewall structure also separate the first air-guided cap 126 and the second air-guided cap 128. The fan blade portion 124 is disposed between the first air-guided cap 126 and the second air-guided cap 128, and pivotally-connected to the fan housing 122 at the second air-guided cap 128. In some embodiments, the fan blade portion 124 includes fan blades, and the fan blades extended from the fan blade portion 124 pivotally-connected to the fan housing 122 toward the sidewall structure of the fan housing 122. In some embodiments, extension directions of the fan blades could be straight or curved. The first housing 140 is disposed on a side of the second air-guided cap 128 away from the first air-guided cap 126. An inlet airway 150 is formed between the first housing 140 and the fan unit 120. The at least one airflow guiding plate 160 is disposed between the first housing 140 and the second air-guided cap 128, and extended from an outline 132 of the main fan inlet 130 toward an outline 152 of the inlet airway 150 and away from the main fan inlet 130. In some embodiments, the at least one airflow guiding plate 160 can be disposed on a surface of the first housing 140 facing the second air-guided cap 128.

Owing to the at least one airflow guiding plate 160 is disposed inside the inlet airway 150, formed between the first housing 140 and the second air-guided cap 128 of the heat dissipation component 100, installed inside a portable computing equipment, and the at least one airflow guiding plate 160 is extended from an outline 132 of the main fan inlet 130 toward an outline 152 of the inlet airway 150 and away from the main fan inlet 130. Therefore, the at least one airflow guiding plate 160 may at least partially guide the airflow inhaled into the inlet airway 150 by the fan unit 120, to force the airflow followed guiding directions of the airflow guiding plate 160, for example, extended directions of the airflow guiding plate 160. The guiding force of the airflow guiding plate 160, such as normal force or frictional force, exerted on the airflow, may drive the airflow flowing into the fan unit 120 more smoothly to some degree, so as to reduce wind shear of the airflow, as well as, turbulence of the airflow. That is, the airflow guiding plate 160 can reduce or avoid the heat dissipation component 100 generated a widespread-frequencies-distribution noise from wind shear or turbulence, so as to mute the heat dissipation component 100.

Referring to the FIG. 2, in some embodiments, the inlet airway 150 has a first distance h along a stacking direction A of the first housing 140 and the fan unit 120. A plate thickness of the at least one airflow guiding plate 160 along the stacking direction A is greater than 50% of the first distance h, to acquire better airflow guiding performance. In some embodiment, the at least one airflow guiding plate 160 may occupy or cover at least part of the inlet airway 150 along the stacking direction A of the first housing 140 and the fan unit 120. Therefore, the at least one airflow guiding plate 160 may strike a balance between guiding the airflow and preserving a greater sectional area of the inlet airway 150, to acquire better performance.

It should be noted that, the airflow guiding plates 160, described herein, should be separated by at least one gap, located between any two adjacent airflow guiding plates 160, and a sectional area of the inlet airway 150 along the stacking direction A of the first housing 140 and the fan unit 120 may not be fully occupied or covered by the at least one airflow guiding plate 160. Therefore, the airflow guiding plate 160 of the heat dissipation component 100 disposed inside the inlet airway 150 can reduce or avoid the installation of the airflow guiding plate 160 blocked or impeded pathway of the airflow through the inlet airway 150 to enter the fan unit 120, which may maintain the airflow inhale by the fan unit 120 flows more smoothly with more flow. It should be understood that, the arrangement of the at least one airflow guiding plate 160, described herein, is only an example, and not intended to limit the present disclosure, could be adjusted to actual demand by those skilled in the art. That is to say, prerequisite of the airflow guiding plate 160 is to guide the airflow flowing into the fan unit 120, and keep the airflow being inhaled by the pressure difference created by the fan unit 120, and flowing through the inlet airway 150.

Referring to the FIG. 1, in some embodiments, the at least one airflow guiding plate 160, extended from the outline 132 of the main fan inlet 130 toward the outline 152 of the inlet airway 150, has a plate length L1. The plate length L1 may be installed to be greater than 50% of a second distance L2 measured from the outline 132 of the main fan inlet 130 to the outline 152 of the inlet airway 150 along the direction of the plate length L1, which may acquire a better performance of guiding the airflow. In some embodiments, the at least one airflow guiding plate 160 is extended from the outline 132 of the main fan inlet 130 toward the outline 152 of the inlet airway 150, along a straight line. In some embodiments, the at least one airflow guiding plate 160 is extended from the outline 132 of the main fan inlet 130 toward the outline 152 of the inlet airway 150, along a streamline curve.

It should be noted that, the airflow guiding plate 160, illustrated in FIG. 1 and FIG. 2, is only an example, and not intended to limit the present disclosure. The structure of the airflow guiding plate 160 is not limited to straight bar shaped, could be adjusted to actual demand by those skilled in the art, within the spirit and the scope of the present disclosure. That is to say, prerequisite of the airflow guiding plate 160 is to guide the airflow flowing through the inlet airway 150, and entering the fan unit 120, in the meanwhile, to maximized the section area of the inlet airway 150. Furthermore, in part of embodiments, the airflow guiding plate 160 may be extended into the area above the main fan inlet 130.

Figure 3:
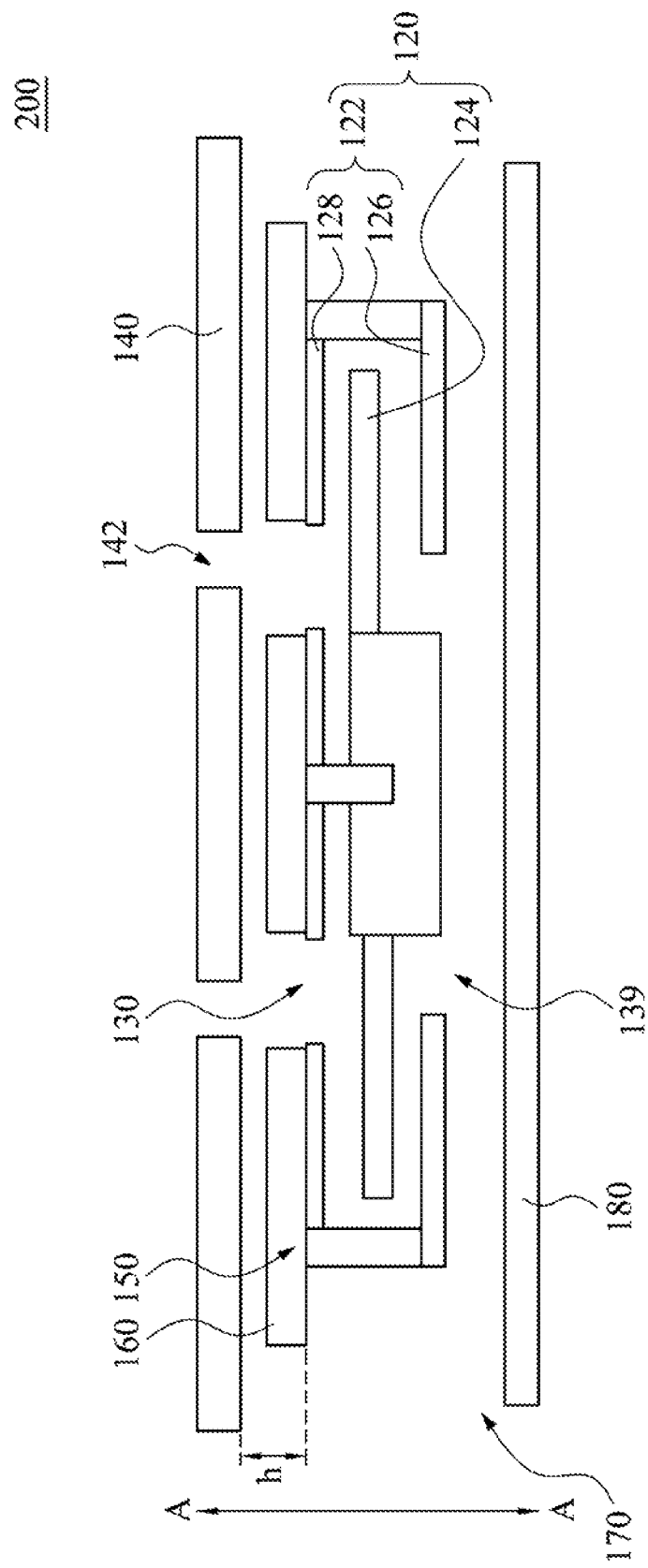
FIG. 3 is a cross-sectional view of a heat dissipation component according to another embodiment of the present disclosure.

FIG. 3 illustrates a cross-sectional view of a heat dissipation component 200 according to another embodiment of the present disclosure. As shown in FIG. 3, in another embodiment, the at least one airflow guiding plate 160 is disposed on a surface of the second air-guided cap 128 facing the first housing 140. In another embodiment, the airflow guiding plates 160 are disposed respectively on the surface of the first housing 140 facing the second air-guided cap 128 or the surface of the second air-guided cap 128 facing the first housing 140 (not drawn).

Referring to the FIG. 1, in some embodiments, the at least one airflow guiding plate 160 is extended from the outline 132 of the main fan inlet 130 to the outline 152 of the inlet airway 150 along a tangent direction of the outline 132 of the main fan inlet 130. Therefore, the airflow guiding plate 160 can acquire a better performance of preventing or reducing the wind shear generated during flowing through the inlet airway 150 into the main fan inlet 130.

In some embodiments, the inlet airway 150 has a neck portion 190 and a tongue point 154. The neck portion 190 is defined at a position of the inlet airway 150 with the minimized width W1. The tongue point 154 is located at the outline 152 of the inlet airway 150 intersected with or corresponded to the neck portion 190. The outline 132 of the main fan inlet 130 formed a circular curve, has a center C1.

A line D1 is formed by interconnected the center C1 of the outline 132 of the main fan inlet 130, and the tongue point 154. One of the at least one airflow guiding plate 160 is extended from a intersection point 134 toward the outline 152 of the inlet airway 150. The intersection point 134 is formed on the outline 132 of the main fan inlet 130 intersected with a line formed between the tongue point and the center. In some embodiments, the airflow guiding plate 160 is extended along a tangential direction of the outline 132 of the main fan inlet 130.

Owing to the neck portion 190, describe herein, is the location along the outline 152 of the inlet airway 150, with a surface parallel to the stacking direction A having smallest sectional area. Therefore, the airflow can be compressed to enter the main fan inlet 130 through reducing the sectional area of the inlet airway 150, such as the neck portion 190, so as to create a nozzle-like flow field to carry more flow into the main fan inlet 130, which may also carry more heat from the fan unit 120. However, reducing of the sectional area may induce or drive the airflow flow underwent a dramatic velocity increasing through the inlet airway 150 to the neck portion 190. The dramatic velocity variation may generate wind shear. It should be understood that, the arrangement of the at least one airflow guiding plate 160, described herein, is only an example, and not intended to limit the present disclosure, could be adjusted to actual demand by those skilled in the art. That is to say, prerequisite of the airflow guiding plate 160 is to guide the airflow, and moderate the velocity variation during the airflow passed by the neck portion 190.

In some embodiments, the outline 132 of the main fan inlet 130 is partitioned from the intersection point 134, to be partitioned into at least two curved portions, such as a curved portion 135, a curved portion 136, a curved portion 137, and a curved portion 138, and any two adjacent curved portions are separated by the first intersection point 134 or at least one second intersection point. In some embodiments, the heat dissipation component 100 may include at least two airflow guiding plate 160, extended from the first intersection point 134 or the second intersection point toward the outline 152 of the inlet airway 150. In some embodiments, the airflow guiding plates 160 are extended along tangential directions of the outline 132 of the main fan inlet 130. In some embodiment, the partition of the outline 132 of the main fan inlet 130 can only equally partition half of the outline 132 into at least two curved portions.

Figure 4:
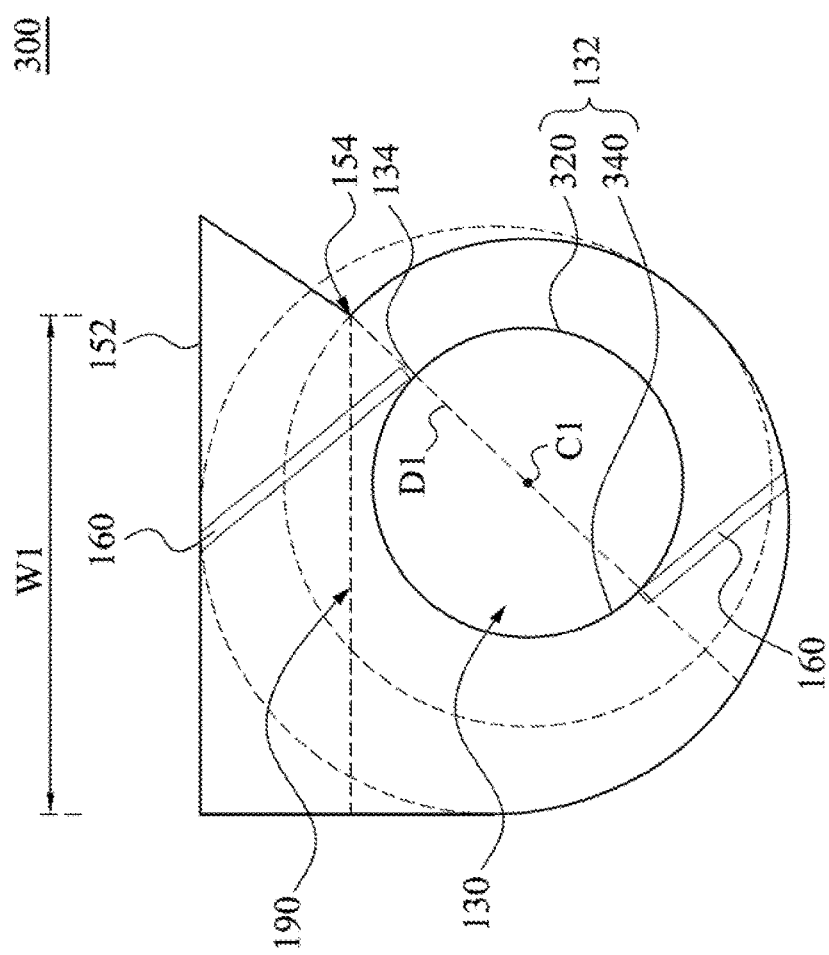
FIG. 4 is a top perspective view of a heat dissipation component according to another embodiment of the present disclosure.

FIG. 4 illustrates a top perspective view of a heat dissipation component 300 according to another embodiment of the present disclosure. As shown in FIG. 4, the outline 132 of the main fan inlet 130 is partitioned from the intersection point 134, to be partitioned into two equally curved portions, such as a curved portion 320, and a curved portion 340, and the curved portion 320, the curved portion 340 are separated by the first intersection point 134 and the second intersection point. In some embodiments, the heat dissipation component 300 may include two airflow guiding plate 160, extended from the first intersection point 134 and the second intersection point toward the outline 152 of the inlet airway 150. In some embodiments, the airflow guiding plates 160 are extended along tangential directions of the outline 132 of the main fan inlet 130. In some embodiment, the partition of the outline 132 of the main fan inlet 130 can be equally partitioned into at least two curved portions.

Referring to the FIG. 2, in some embodiments, the first housing 140 may has housing inlets 142, interconnected a side of the first housing 140 away from the fan unit 120 and the inlet airway 150.

In some embodiment, the heat dissipation component 100 may further include a second housing 180, disposed on a side of the fan unit 120 away from the first housing 140. An outlet airway 170 is formed between the second housing 180 and the first air-guided cap 126 of the fan unit 120. The first air-guided cap 126 has a main fan outlet 139, interconnected the outlet airway 170.

Summarized from the above, a heat dissipation component disposed inside a portable computing equipment is provided. The heat dissipation component includes a fan unit, a first housing, and at least one airflow guiding plate. The fan unit includes a fan housing and a fan blade portion. The fan housing includes a first air-guided cap and a second air-guided cap. The second air-guided cap is disposed on the first air-guided cap. The second air-guided cap has a main fan inlet. The fan blade portion is disposed between the first air-guided cap and the second air-guided cap, and pivotally-connected to the fan housing at the second air-guided cap. The first housing is disposed on a side of the second air-guided cap away from the first air-guided cap. An inlet airway is formed between the first housing and the fan unit. At least one airflow guiding plate is disposed between the first housing and the second air-guided cap, and extended from an outline of the main fan inlet toward an outline of the inlet airway and away from the main fan inlet. Owing to the airflow guiding plate is disposed inside the inlet airway between the first housing and the second air-guided cap, the airflow guiding plate may reduce or minimized wind shear generated during airflow flowing through the inlet airway into the fan unit, so as to reduce noise generated by the wind shear, to mute the heat dissipation component.

Although some embodiments of the present disclosure and their advantages have been described in detail, it should be understood that various changes, substitutions, and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, fabricate, composition of matter, means, methods, and steps described in the specification. As one of ordinary skill in the art will readily appreciate from the disclosure of the present disclosure, processes, machines, fabricate, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, fabricate, compositions of matter, means, methods, or steps.

What is claimed is:

1. A heat dissipation component, disposed inside a portable computing equipment, the heat dissipation component comprising:
    a fan unit, comprising:
        a fan housing, comprising:
            a first air-guided cap; and
            a second air-guided cap, disposed on the first air-guided cap, the second air-guided cap having a main fan inlet, and the main fan inlet has a center; and a fan blade portion, disposed between the first air-guided cap and the second air-guided cap, and pivotally-connected to the fan housing at the second air-guided cap;

a first housing, disposed on a side of the second air-guided cap away from the first air-guided cap, an inlet airway being formed between the first housing and the fan unit, wherein the inlet airway has a neck portion and a tongue point, the tongue point is located at an outline of the inlet airway intersected with the neck portion; and at least one airflow guiding plate, disposed between the first housing and the second air-guided cap, and extended from an outline of the main fan inlet toward the outline of the inlet airway and away from the main fan inlet, wherein the at least one airflow guiding plate is extended from a first intersection point toward the outline of the inlet airway, the first intersection point is formed on the outline of the main fan inlet intersected with a line formed between the tongue point and the center.

2. The heat dissipation component of claim 1, wherein the inlet airway has a first distance along a stacking direction of the first housing and the fan unit, a plate thickness of the at least one airflow guiding plate along the stacking direction is greater than 50% of the first distance.

3. The heat dissipation component of claim 1, wherein the at least one airflow guiding plate, extended from the outline of the main fan inlet toward the outline of the inlet airway, has a plate length, the plate length is greater than 50% of a second distance measured from the outline of the main fan inlet to the outline of the inlet airway along the direction of the plate length.

4. The heat dissipation component of claim 1, wherein the at least one airflow guiding plate is extended from the outline of the main fan inlet to the outline of the inlet airway along a tangential direction of the outline of the main fan inlet.

5. The heat dissipation component of claim 1, wherein the at least one airflow guiding plate is extended along a tangential direction of the outline of the main fan inlet.

6. The heat dissipation component of claim 1, wherein the outline of the main fan inlet is partitioned into at least two curved portions, and any two adjacent curved portions are separated by the first intersection point or at least one second intersection point, wherein the at least one airflow guiding plate comprises two airflow guiding plates, extended from the first intersection point or the second intersection point toward the outline of the inlet airway.

7. The heat dissipation component of claim 6, wherein the two airflow guiding plates are extended along tangential directions of the outline of the main fan inlet.

8. The heat dissipation component of claim 6, wherein the outline of the main fan inlet is equally partitioned into at least two curved portions.

9. The heat dissipation component of claim 6, wherein half of the outline of the main fan inlet is equally partitioned into at least two curved portions.

10. The heat dissipation component of claim 1, wherein the at least one airflow guiding plate is disposed on a surface of the first housing facing the second air-guided cap.

11. The heat dissipation component of claim 1, wherein the at least one airflow guiding plate is disposed on a surface of the second air-guided cap facing the first housing.

12. The heat dissipation component of claim 1, wherein the first housing has a plurality of housing inlets, interconnected a side of the first housing away from the fan unit and the inlet airway.

13. The heat dissipation component of claim 1, further comprising a second housing, disposed on a side of the fan unit away from the first housing, and an outlet airway is formed between the second housing and the first air-guided cap of the fan unit, wherein the first air-guided cap has a main fan outlet, interconnected the outlet airway.

* * * * *